United States Patent [19]

Mardikian

[11] Patent Number: 5,367,978
[45] Date of Patent: * Nov. 29, 1994

[54] SHOCK-ABSORBER MOUNTED SEAT FOR PERSONAL WATERCRAFT AND BOATS

[75] Inventor: Albert Mardikian, Corona Del Mar, Calif.

[73] Assignee: Mardikian 1991 Irrevocable Trust, Corona Del Mar, Calif.

[*] Notice: The portion of the term of this patent subsequent to May 10, 2011 has been disclaimed.

[21] Appl. No.: 120,252

[22] Filed: Sep. 10, 1993

Related U.S. Application Data

[63] Continuation-in-part of Ser. No. 926,476, Aug. 5, 1992, Pat. No. 5,309,861.

[51] Int. Cl.⁵ .................................. B63B 29/00
[52] U.S. Cl. ........................... 114/363; 267/131; 188/109; 297/328
[58] Field of Search ............... 114/188, 191, 194, 343, 114/363; 441/129, 130; 188/106 R, 109, 321.11; 267/64.27, 64.28, 64.23, 195, 131–133, 217, 219, 221, 286, 291; 297/328, 326, 313, DIG. 8, 344.16; 249/562, 565, 567, 631

[56] References Cited

U.S. PATENT DOCUMENTS

| | | | |
|---|---|---|---|
| 4,206,908 | 8/1980 | Mercier | 267/64.23 |
| 4,561,621 | 12/1985 | Hill | 248/397 |
| 4,662,597 | 5/1987 | Uecker et al. | 248/564 |
| 4,709,649 | 12/1987 | Wann | 114/363 |
| 4,743,065 | 5/1988 | Meiller | 297/300 |
| 4,977,848 | 12/1990 | Currey | 114/363 |
| 4,979,458 | 12/1990 | Bouza | 114/363 |
| 4,993,694 | 2/1991 | Gandiglio | 267/64.27 |
| 5,004,206 | 4/1991 | Anderson | 248/585 |
| 5,026,117 | 6/1991 | Faiks et al. | 297/304 |
| 5,044,299 | 9/1991 | Frank | 114/363 |
| 5,092,260 | 3/1992 | Mardikian | 114/285 |
| 5,176,355 | 1/1993 | Carter | 297/344.16 |

FOREIGN PATENT DOCUMENTS 2211530 9/1977 Germany ............... B03B 29/04

OTHER PUBLICATIONS

See Doo Wave Magazine, p. 40 entitled RUNABOUTS by Drew Armstrong data unknown.

Primary Examiner—Robert J. Oberleitner
Assistant Examiner—Clifford T. Bartz
Attorney, Agent, or Firm—Klein & Szekeres

[57] ABSTRACT

A shock absorbing seat is provided in a personal watercraft or boat. The seat has an elongated configuration and is mounted at the front end thereof to the hull or other structural member of the watercraft for limited pivoting motion relative to the hull or structural member. A shock absorber assembly which includes a fluid filled cylinder, a piston therein, and a coil spring externally mounted to the cylinder piston combination, or an elastic envelope filled with pressurized air, is mounted for limited motion relative to the hull or other structural member of the watercraft, and to the seat so as to support at least a substantial portion of the weight of the seat and occupant thereof, and to absorb forces generated between the hull and the seat while the watercraft is in motion.

10 Claims, 4 Drawing Sheets

5,367,978

SHOCK-ABSORBER MOUNTED SEAT FOR PERSONAL WATERCRAFT AND BOATS

CROSS-REFERENCE TO RELATED APPLICATION

The present application is a continuation-in-part of pending application Ser. No. 07/926,476, filed on Aug. 5, 1992 to be issued as U.S. Pat. No. 5,309,861 issued May 10, 1994.

BACKGROUND OF THE INVENTION

1. Field of the Invention

The present invention is directed to a personal watercraft, and particularly to a personal watercraft having a shock absorber mounted seat for the occupant.

2. Brief Description of the Prior Art

Personal watercraft are well known in the art. Such craft typically employs a jet pump for generating a rearwardly directed stream of water which provides the forward thrust required to propel the craft and its occupant. The direction of propulsion is controlled by the positioning of a movable steering nozzle which receives the stream of water from the pump and directs the flow so as to divide the thrust into the desired directional components. The positioning of the nozzle is affected by a steering cable system which connects the nozzle to a handlebar controlled by the driver of the watercraft. The handlebar typically includes a throttle control and an electrical on and off switch. U.S. Pat. No. 5,092,260 describes a personal watercraft which has an adjustable flap on the bottom of the craft, so that the angle at which the flap meets the water can be controlled by the operator of the craft. The flap can also serve as a brake. As far as the arrangement for accommodating the driver/occupant of the personal watercraft is concerned, one type of personal watercraft requires the occupant to stand on the watercraft while riding. This type of watercraft is also commonly known as a "jet ski". Although jet skis of this type are popular, a related sit-down type of personal watercraft has also recently gained great popularity. Such "sit-down" models include a seat which the driver usually occupies in sitting reclined or semi-prone position to drive the watercraft. It is well known that "stand-up" jet skis, as well as the related "sit-down" models tend to be driven fast on the water. Therefore, the occupants of such watercraft are subjected to substantial shocks and bumps as the rapidly traveling watercraft meets the waves. In order to improve the comfort of the occupant/driver of personal watercraft, the present invention provides a shock absorbing seat for the watercraft.

SUMMARY OF THE INVENTION

It is an object of the present invention to provide a personal watercraft which allows its occupant to travel on the watercraft in increased comfort.

It is another object of the present invention to provide a personal watercraft which has a seat which allows the occupant to use the watercraft in an inclined comfortable position and which cushions the seat against shocks experienced as the craft rides on water.

It is still another object of the present invention to provide an improved seat for personal watercraft and for boats which travel fast on the water.

The foregoing and other objects and advantages are attained by a personal watercraft which has, in addition to an engine and drive means powered by the engine, a seat attached to a shock absorber, which is attached to the hull of the watercraft, the attachment being in such a manner that at least a substantial portion of the weight of the seat and of the occupant therein is supported by the shock absorber.

The features of the present invention can be best understood together with further objects and advantages, by reference to the following description, taken in connection with the accompanying drawings, wherein like numerals indicate like parts.

DESCRIPTION OF THE PREFERRED EMBODIMENTS

The following specification taken in conjunction with the drawings sets forth the preferred embodiments of the present invention. The embodiments of the invention disclosed herein are the best modes contemplated by the inventor for carrying out his invention in a commercial environment, although it should be understood that various modifications can be accomplished within the parameters of the present invention.

Figure 1:
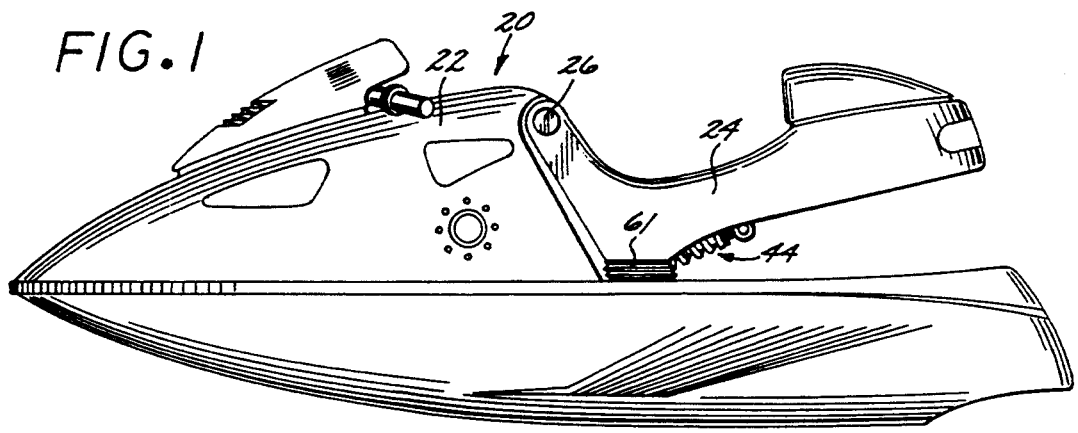
FIG. 1 is a side view showing the first preferred embodiment of the present invention.

Referring now to the drawing figures, and particularly to FIG. 1, the first preferred embodiment of the personal watercraft having a shock absorber mounted seat, is disclosed. For the purposes of this description personal watercraft is defined by the definition of the Personal Watercraft Industry Association, which is as follows:

"Personal watercraft shall mean a vessel which uses an inboard motor powering a jet pump as its primary source of motive power and which is designed to be operated by a person sitting, or kneeling on the vessel, rather than the conventional manner of sitting or standing inside the vessel".

Similar definition of a personal watercraft are provided by the National Association of State Boating Law Administrators, by the Society of Automotive Engineers and by the National Boat Safety Advisory Council. It should be noted in connection with the foregoing, that the present invention pertains to personal watercraft of the type on which the occupant sits straight up, reclined, or semi-prone while traveling on water.

Thus, the preferred embodiment of the personal watercraft 20 includes a hull 22. The hull 22 is usually made in accordance with the state of the art from fiberglass. Inside the hull 22 there is a gasoline powered engine (not shown) and jet pumps (not shown) driven by the motor. The jet pumps (not shown) draw in water and direct it outward so as to propel the watercraft 20 forward. Inasmuch, as the present invention is directed to the shock absorber supported seat assembly, further description of those operating components of the watercraft which do not relate to the seat and shock absorber assembly, is not considered necessary.

Figure 2:
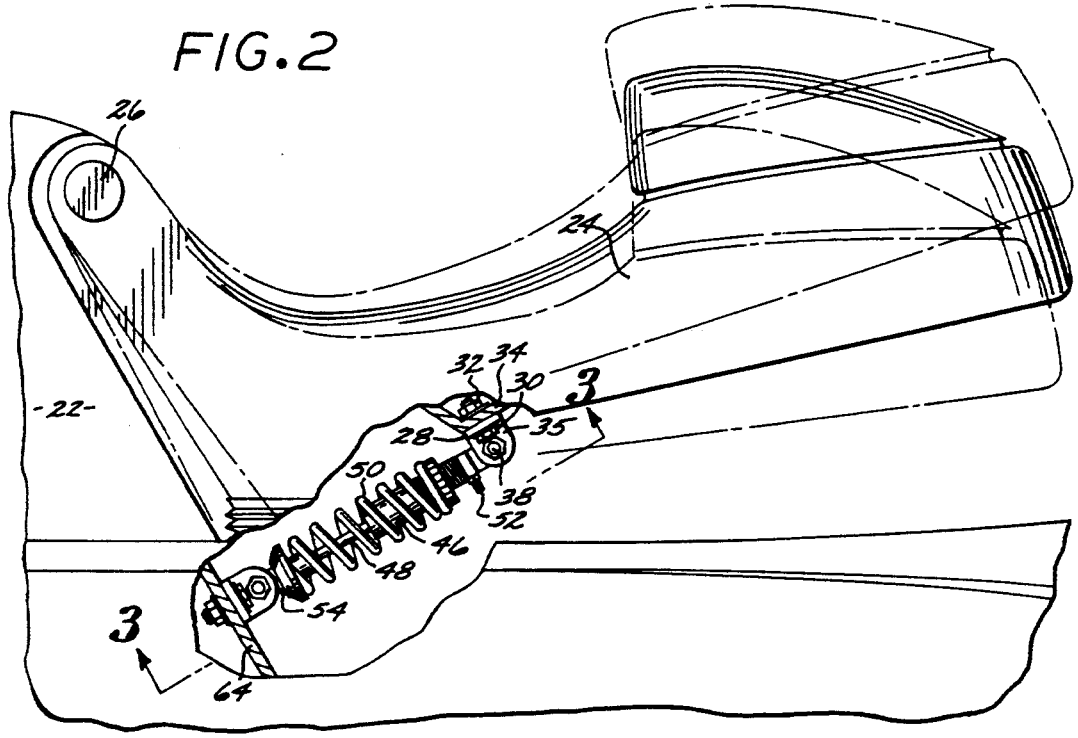
FIG. 2 is a partial side view of the first preferred embodiment, with a portion of the hull of the watercraft cut away.

The seat 24 of the first preferred embodiment comprises an elongated streamlined body, as shown on FIGS. 1 and 2. The seat 24, like the hull 20 is preferably made from fiberglass, although it can be made from other materials (plastics and aluminum) as well. The seat 24 is pivotably mounted to the hull 22 substantially at the front end of the seat 24. A pivot pin 26 which is made from steel or aluminum, and which mounts the seat 24 to the hull 22 in a cantilevered fashion to permit up and down motion relative to the hull 22, is shown on FIGS. 1 and 2.

Figure 3:
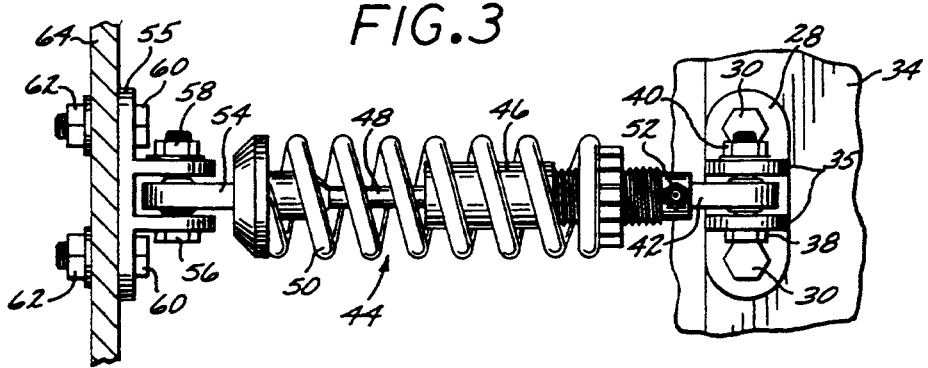
FIG. 3 is a top view of a shock absorbing assembly of the first preferred embodiment of the present invention, the view taken on lines 3,3 of FIG. 2.
Figure 4:
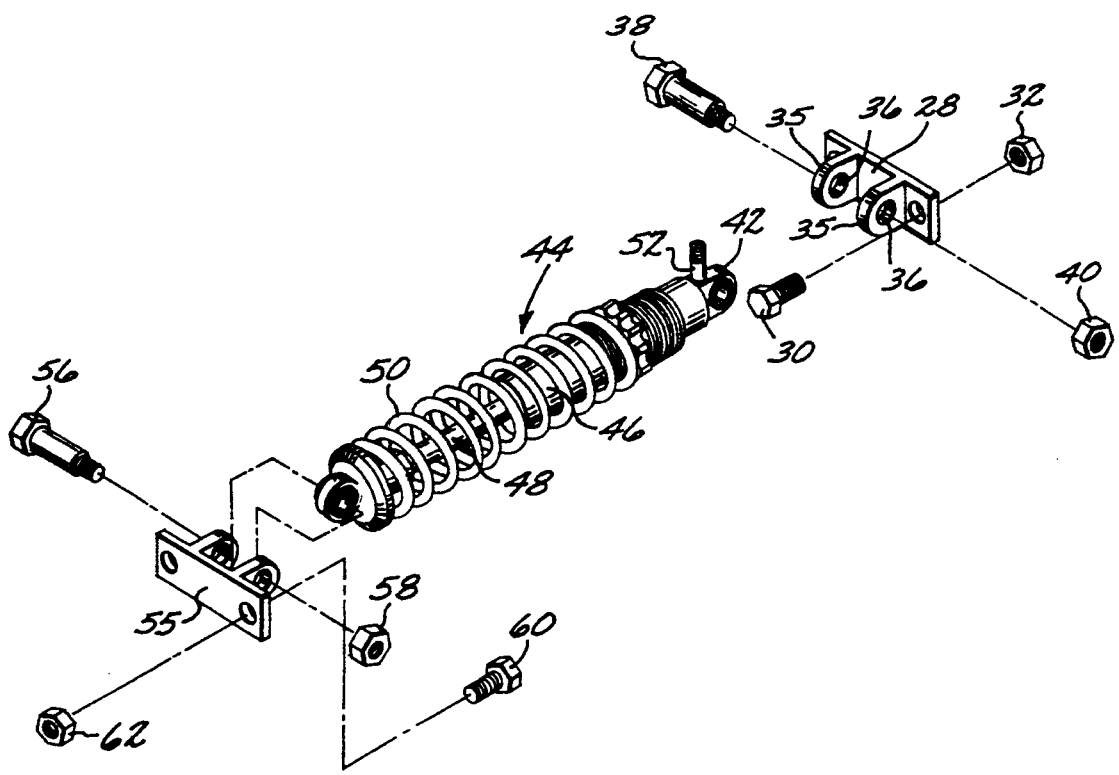
FIG. 4 is a partially exploded perspective view of the shock absorbing assembly of the first preferred embodiment.
Figure 5:
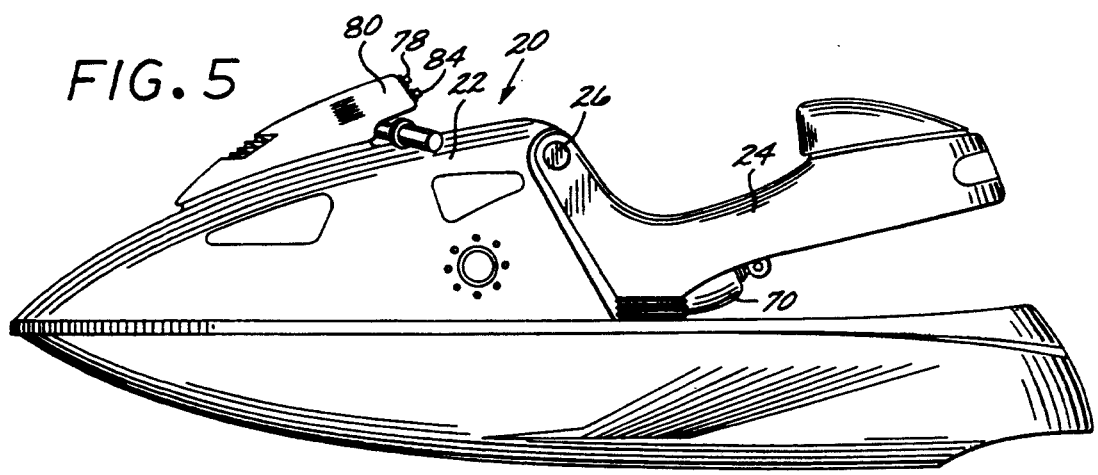
FIG. 5 is a side view showing the second preferred embodiment of the present invention.
Figure 6:
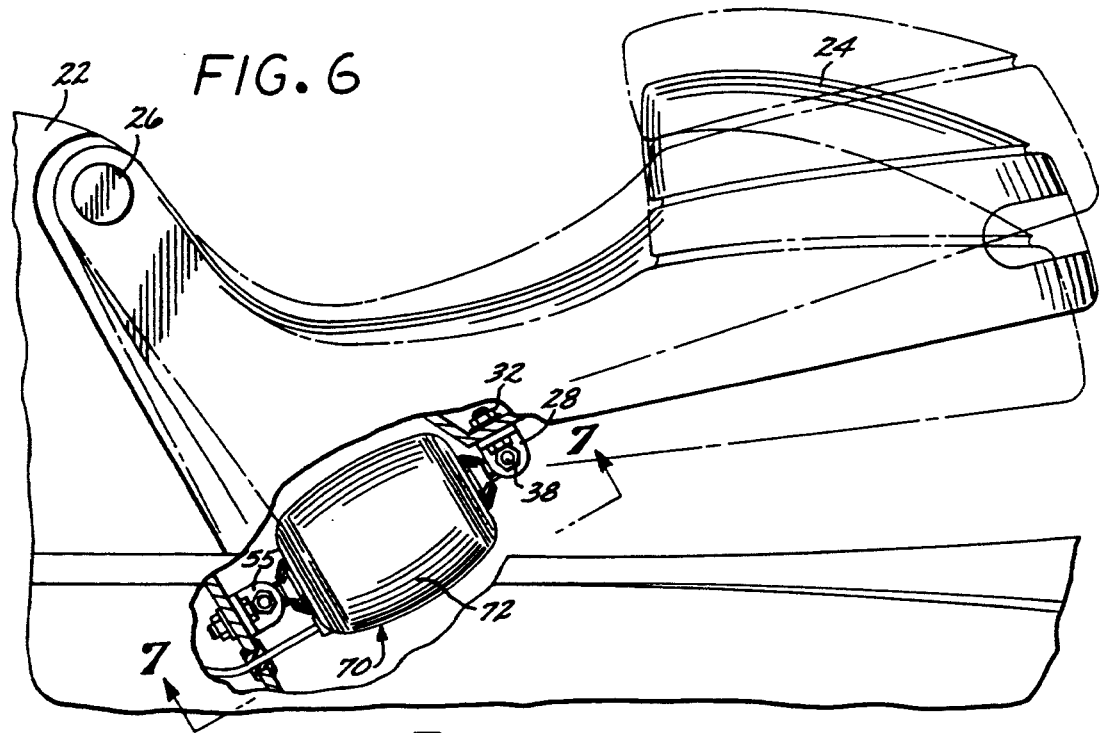
FIG. 6 is a partial side view of the second preferred embodiment, with a portion of the hull of the watercraft cut away.
Figure 7:
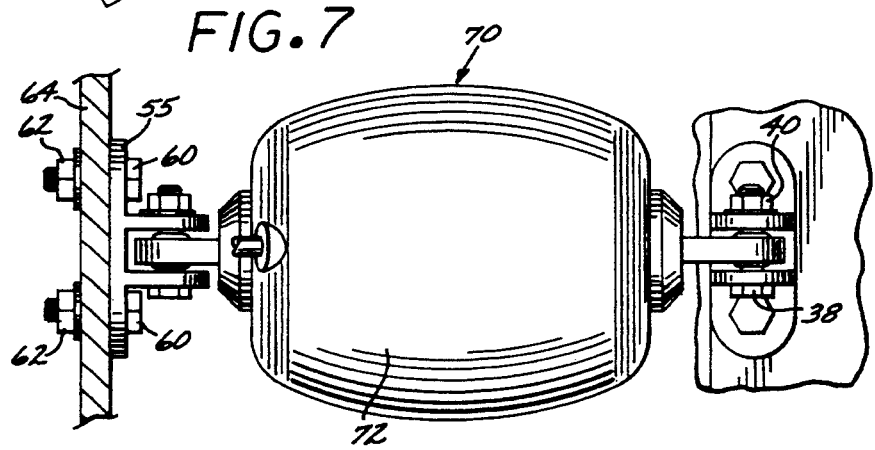
FIG. 7 is a top view of a shock absorbing assembly of the second preferred embodiment of the present invention, the view taken on lines 7,7 of FIG. 6.
Figure 8:
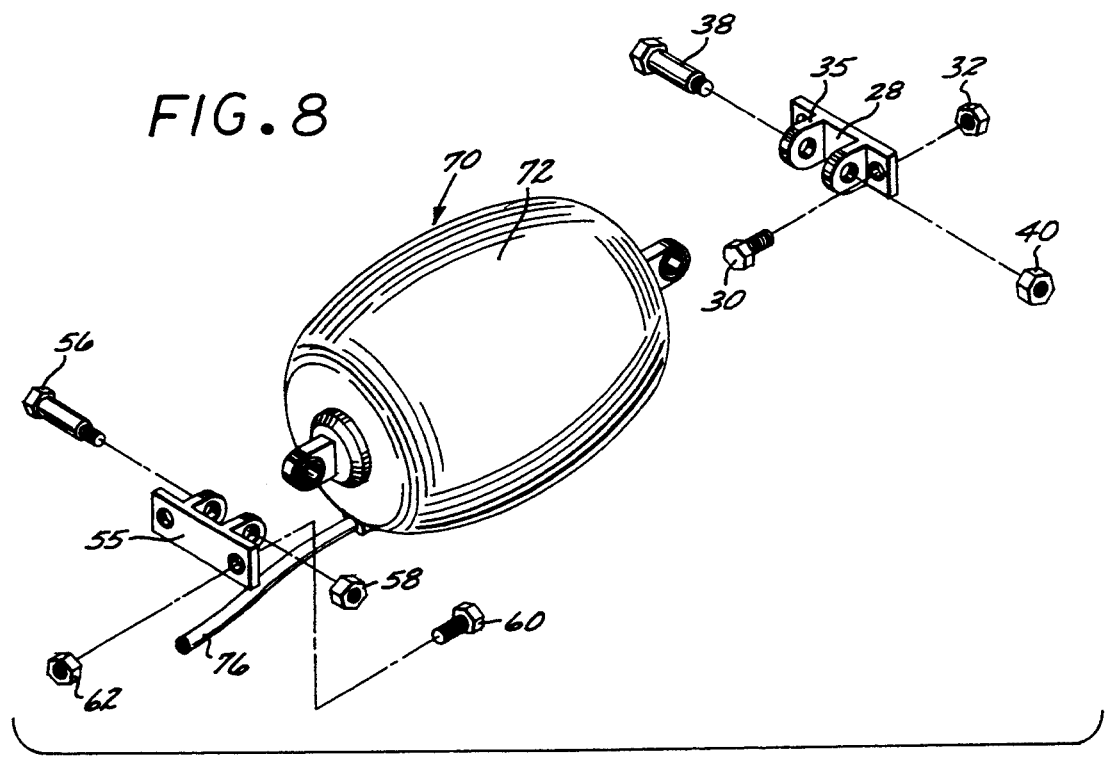
FIG. 8 is a partially exploded perspective view of the shock absorbing assembly of the second preferred embodiment.

Referring now primarily to FIGS. 2, 3, and 4, mounting of the seat 24 on a shock absorber assembly is disclosed. Thus, a bracket 28 is attached by bolts 30 and nuts 32 to a plate 34 in the seat 24. The plate 34 to which the bracket 28 is attached may be an integral part of the fiberglass seat 24, or it may be a steel or aluminum plate attached to the seat 24 for this purpose. The bracket 28 includes two parallel disposed ears 35, each of which has a hole 36 to receive a mounting bolt 38. The mounting bolt 38 and a matching nut 40 pivotably attaches the top part 42 of a shock absorber 44 to the mounting bracket 28. The shock absorber 44 of the first preferred embodiment by itself is known in the art, and therefore need not be described here in detail. In summary however, it is noted that the shock absorber 44 includes an air or liquid filled cylinder 46 and a piston which is mounted to move in the cylinder 46 against resistance of the fluid. The shaft 48 of the piston which protrudes from the cylinder 46 is identified with the reference numeral 48 in the drawing figures. An exterior spring 50 is also mounted on the shock absorber, to form the overall shock absorber, or shock absorbing assembly, which per se is known in the art, as noted above. Those skilled in the art will readily recognize that the shock absorbing characteristics of the above-described shock absorber assembly depend both on the characteristics of the spring 50 and of the air or liquid filled cylinder and piston combination. In fact, in the shock absorber assembly utilized in the present invention, as in the prior art as well, the shock absorbing characteristics can be varied within certain limits by adjusting the air pressure within the piston. A valved air inlet for this purpose is shown and bears the reference numeral 52. The lower portion 54 of the shock absorber, (more precisely stated of the shaft 48) which carries the piston (not shown) is pivotably mounted in a bracket 55 similar in construction to the bracket 28. A bolt 56 and a matching nut 58 mounts the lower part 54 of the shock absorber to the bracket 55. The bracket 55 is mounted by another pair of bolts 60 and matching nut 62 to a stainless steel or aluminum plate 64 which is anchored by bolts (not shown) to the fiberglass hull 20.

The shock absorber 44 is mounted relative to the seat 24 at such an angle that the shock absorber 44 is substantially aligned with the direction of movement which the cantilevered mounted seat 24 undergoes, as it oscillates relative to its resting position. This is apparent from an inspection of the drawing figures, and particularly from FIG. 2. The shock absorber which is incorporated in the preferred embodiment of the invention is obtained from Works Performance Co. of Northridge, Calif., and has capacity in the range of 100 to 400 pounds. A boot 68 made from rubber, vinyl or like material is mounted between the bottom of the seat 24 and the hull 22, in effect protecting the lower portion of the shock absorber assembly 44 from exposure to water. Another boot (not shown) which can also be made of rubber, vinyl or like material can be utilized to cover and protect from corrosion the entire shock absorber assembly.

A significant advantage of the present invention is that a person sitting in a comfortable reclined or semi-prone position on the personal watercraft 20 of the invention, is much better protected against shock and bumps while riding on the water than a person riding in prior art personal watercraft. This is because the shock absorber in combination with the cantilever mounted seat absorbs a significant portion of the shocks and bumps created during travel.

FIGS. 5-9 show a second embodiment of the personal watercraft of the present invention which has a shock absorber mounted seat. The second embodiment differs from the first preferred embodiment primarily in the nature of the shock absorber, which in this embodiment bears the reference numeral 70. Mounting of the shock absorber 70 to the seat 24 and the hull 22 is accomplished substantially in the same way as in the first preferred embodiment. Thus a bracket 28 is utilized to pivotably mount the top part of the shock absorber 70 to a plate 34 of the seat 24 with a mounting bolt 38 and a matching nut 40. The lower part of the shock absorber 70 is pivotably mounted in a bracket 55 which is similar in construction to the upper bracket 28. As in the first preferred embodiment the lower bracket 55 is anchored with a bolt 60 and a matching nut 62 to a stainless steel or aluminum plate 64 which is in turn mounted by bolts (not shown) to the fiberglass hull 20.

The shock absorber 70 of the second preferred embodiment is an air filled shock absorber which operates to absorb shocks by virtue of having pressurized air in an elastic outer envelope 72. Such shock absorbers per se are known primarily for use in suspension of cars, are commercially available and therefore their construction need not be described here in detail. Mercedes Benz of Germany manufactures, for example such air filled shock absorbers which are commonly known as "BOSCH bags". The shock absorber, also known in the automotive trade as "air bag" employed in the second preferred embodiment is manufactured by Ford Motor Company of Detroit Mich., part number FILY5310A, has a capacity for 100 to 500 lb weight, and the pressure inside the air bag may range between 100 to 500 PSI.

Figure 9:
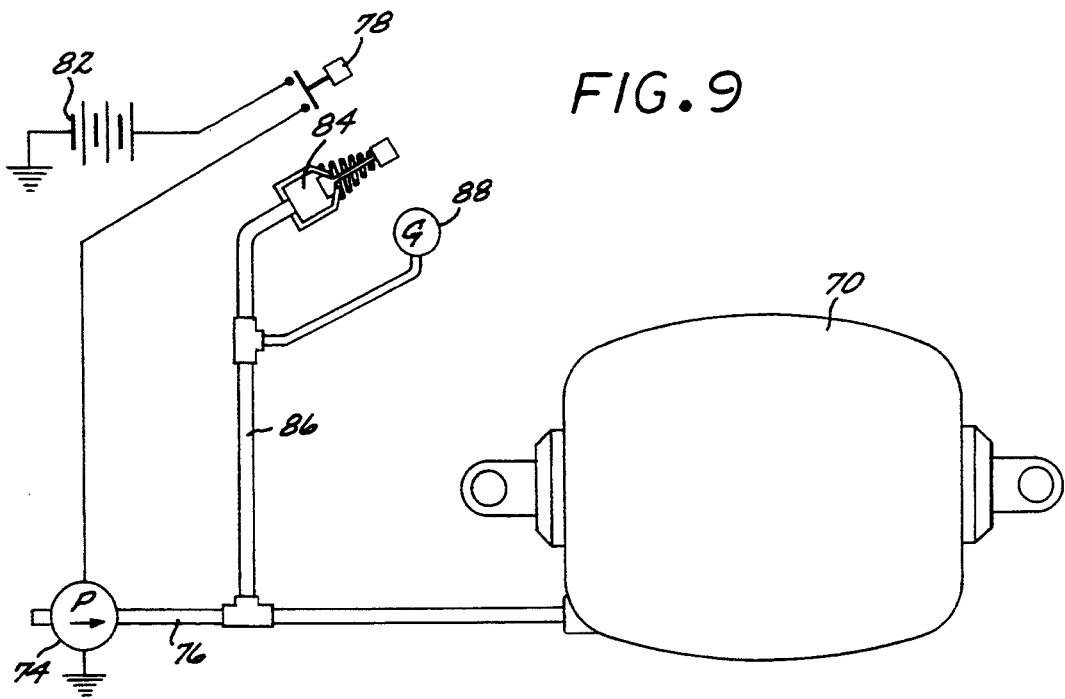
FIG. 9 is a schematic view of the means for adding and or releasing air from the shock-absorber of the second preferred embodiment.

Referring now back to the drawings, and particularly to FIG. 9 thereof, it is a feature of the second preferred embodiment that pressure in the air bag shock absorber 70 can be varied to vary its shock absorbing characteristics and load carrying capacity. For this purpose an electrically powered air pump 74 is connected with a line 76 to the shock absorber 70, and a manually controllable switch 78 is mounted on the handlebar or steering column 80 where it is readily accessible to the operator (not shown) of the personal watercraft. In the herein described preferred embodiment the air pump is a commercially available model, available from Monroe Co. Detroit Mich., part number 25185. This pump is powered by the 12 V DC battery 82 which is normally incorporated in the personal watercraft. The switch 78, pump 74 and battery 82 are schematically shown on FIG. 9.

To enable the operator or passenger (not shown) of the personal watercraft to release air from the air bag-shock absorber 70, an air release valve 84 is provided, also mounted on the handlebar or steering column 80 for ready accessibility to the operator/passenger (not shown). The release valve 84 which per se is of standard construction is connected to the air bag-shock absorber 70 by a line 86. Optionally a pressure gauge 88 is also provided, attached to the handlebar or steering column 80, to display the air pressure in the shock absorber 70.

It will be readily understood by those skilled in the art from the foregoing that the operator/passenger of the personal watercraft may adjust the shock absorbing characteristics of the shock absorber 70 of the second preferred embodiment by adding to or releasing air from the shock absorber 70. This can be done while the personal watercraft is stationary or while it is traveling on water, and it can be done for the purpose of adjusting the load carrying characteristics because of differing weights of different passengers, or to adjust comfort level due to differing speeds of travel, waive conditions, or for other reasons.

It will also be readily understood by those skilled in the art from the present description and inspection of the drawing figures that in both embodiments of the invention it is the shock absorber which supports the seat 24 and the operator/passenger in the seat 24 in the vertical direction.

Instead of a manual control of air pressure of the air bag shock absorber of the present invention, it is also within the scope of the present invention to provide control for the position of the seat 24 relative to the hull 22, by adjusting air pressure in the shock absorber 70 against a varying load (different weight passengers) so as to maintain the seat 22 in a predetermined position. This can be accomplished, for example, by a position sensor (not shown) for sensing position of the seat 24, and to couple the position sensor (not shown) with a microswitch (not shown) so as to automatically add to or release air from the shock absorber 70 until the desired position of the seat 24 is achieved. Position sensors, microswitches and associated circuitry which can be used in the foregoing structure are available commercially, and need not be described here.

Several modifications of the present invention may become readily apparent to those skilled in the art in light of the foregoing disclosure. Therefore, the scope of the present invention should be interpreted solely from the following claims, as such claims are read in light of the disclosure.

What is claimed is:

1. A personal watercraft of the type which accommodates its driver in a seated position, comprising a hull section, and a seat mounted to the hull in a cantilevered position by mounting means which permit movement of the seat relative to the hull, the seat being configured for accommodating a driver of the watercraft in said seated position, and shock absorber means comprising an elastic envelope filled with pressurized air, the shock absorber means being mounted to the hull and to the seat for being positioned between the hull and the seat with a substantially inclined longitudinal axis and for absorbing forces generated by movement of the seat relative to the hull when the personal watercraft travels on the water, the shock absorber means being the only force absorbing means which supports the seat in a vertical direction.

2. The personal watercraft of claim 1 wherein the shock absorbing means is pivotably mounted to the bottom of the seat, and pivotably mounted to the hull.

3. The personal watercraft of claim 1 wherein the mounting means comprise a substantially horizontally disposed pivot pin which permits substantially up and down motion of the seat relative to the hull.

4. The personal watercraft of claim 3 wherein the seat comprises an elongated member having a front end, and wherein the pivot pin is mounted substantially to the front end of the seat, whereby the seat is mounted in a cantilevered fashion.

5. In a personal watercraft of the type which accommodates its driver in a seated semi-prone position and which has a hull and a seat configured to accommodate its driver in said seated semi-prone position, the improvement comprising:

first means for mounting the seat in a cantilevered position for limited up and down pivoting motion about a horizontal axis of pivot relative to the hull, and shock absorber means comprising an elastic envelope filled with pressurized air mounted to the hull and to the seat for being positioned between the hull and the seat with a substantially inclined longitudinal axis for absorbing forces generated between the seat and the hull while the watercraft is traveling on water, the shock absorber means being the only force absorbing means which supports the seat in a vertical direction.

6. The improvement of claim 5 wherein the seat comprises an elongated member, and wherein the first means comprise means for mounting the seat in a cantilevered fashion to the hull.

7. The improvement of claim 6 wherein the first means include a pivot pin which is substantially horizontally disposed while mounted into the hull and about which the seat can undergo limited up and down pivoting motion.

8. The improvement of claim 7 wherein a first end of the shock absorber means is pivotably mounted to the hull, and a second end of the shock absorber means is pivotably mounted to the seat.

9. In a personal watercraft of the type which accommodates its driver in a seated position and which has a hull and an elongated seat configured to accommodate a driver of the watercraft in said seated position, the improvement comprising:

first means for mounting for limited up and down pivoting motion the elongated seat substantially at the front end thereof to the hull of the watercraft, and shock absorber means comprising an elastic envelope filled with pressurized air, the shock absorber means being mounted for limited relative motion to the hull and mounted for limited relative motion to the seat, for being positioned between the hull and the seat with a substantially inclined longitudinal axis for absorbing forces generated between the seat and the hull while the watercraft is traveling on water, the shock absorber means being the only force absorbing means which supports the seat in a vertical direction.

10. The improvement of claim 9 wherein the first means comprise a substantially horizontally disposed pivot pin mounted onto the hull, the elongated seat being mounted to the pivot pin for pivoting motion about the pin.

* * * * *